(12) United States Patent
Matitsine

(10) Patent No.: US 8,518,537 B2
(45) Date of Patent: Aug. 27, 2013

(54) ARTIFICIAL DIELECTRIC MATERIAL AND METHOD OF MANUFACTURING THE SAME

(75) Inventor: Serguei Matitsine, Singapore (SG)

(73) Assignee: Matsing Pte. Ltd., Singapore (SG)

( * ) Notice: Subject to any disclaimer, the term of this patent is extended or adjusted under 35 U.S.C. 154(b) by 364 days.

(21) Appl. No.: 12/808,150

(22) PCT Filed: Dec. 17, 2007

(86) PCT No.: PCT/SG2007/000430
§ 371 (c)(1),
(2), (4) Date: Sep. 24, 2010

(87) PCT Pub. No.: WO2009/078807
PCT Pub. Date: Jun. 25, 2009

(65) Prior Publication Data
US 2011/0003131 A1   Jan. 6, 2011

(51) Int. Cl.
*B32B 5/16* (2006.01)
(52) U.S. Cl.
USPC .......................... 428/402; 428/323
(58) Field of Classification Search
USPC .................... 428/403–407, 323, 402
See application file for complete search history.

(56) References Cited

U.S. PATENT DOCUMENTS

2001/0029119 A1*  10/2001  Chung ........................ 439/91
2004/0104847 A1*   6/2004  Killen et al. ........... 343/700 MS

FOREIGN PATENT DOCUMENTS

| EP | 0 309 982 A2 | | 4/1989 |
| EP | 0309982 | * | 4/1989 |
| GB | 665747 | | 1/1952 |
| WO | WO02/102584 | * | 11/2002 |
| WO | WO 02/102584 A1 | | 12/2002 |

OTHER PUBLICATIONS

International Search Report PCT/SG2007/000430 dated Feb. 13, 2008.

* cited by examiner

*Primary Examiner* — Leszek Kiliman
(74) *Attorney, Agent, or Firm* — Foley & Lardner LLP

(57) ABSTRACT

An artificial dielectric material comprising a plurality of blocks of dielectric material, each block have at least one conductive fiber or wire embedded within. A method of making the material is disclosed where a plurality of strands or wires are embedded in dielectric layer which is then chopped in blocks. These blocks then fall randomly into a container in any order or pattern and are glued into a solid layer.

24 Claims, 7 Drawing Sheets

ARTIFICIAL DIELECTRIC MATERIAL AND METHOD OF MANUFACTURING THE SAME

CROSS-REFERENCE TO RELATED APPLICATIONS

This application is the U.S. national phase of PCT/SG2007/000430 filed Dec. 17, 2007, the subject matter of which is incorporated in entirety by reference.

FIELD OF INVENTION

The present invention relates to an artificial dielectric material and a method of manufacturing the same.

BACKGROUND

Artificial dielectric material mixed with randomly distributed conductive fibres is a well-known composition.

However, various problems exist affecting dielectric losses in conventional artificial dielectric material mixed with randomly distributed conductive fibres. FIG. 1 (Prior Art) illustrates randomly distributed conductive fibres 102 in a conventional artificial dielectric material. As shown in FIG. 1, the distribution of the fibres in the material is not uniform, some parts of the material consist of more conductive fibres than other parts. Also, after mixing, some conductive fibres make contact with one another to create conductive clusters 104. Each cluster may consist of a different number of fibres. The overall effect of fibres and other fibres or clusters having different distances apart and non-uniform concentrations of fibres is an increase in dielectric losses in the material.

In the complex representation of the permittivity of a dielectric material, $\in$" represents the imaginary part of the permittivity of the material, which is related to the rate at which energy is absorbed by the material (converted into thermal energy, etc.). Hence, $\in$" is a measure of dielectric losses in a dielectric material. The response of dielectric materials to external electromagnetic fields generally depends on the frequency of the field. In order to achieve small losses (i.e. small $\in$") at a required frequency for dielectric material mixed with conductive fibres, it is necessary that the length of the fibres in the dielectric material be much smaller compared to the wavelength at the required the frequency.

The creation of clusters affects uniformity, anisotropy, and increases the dielectric losses of the material by increasing the resonance width of $\in$". When fibres make contact with each other, it is equivalent to increasing the length of the fibres. This increase in length undesirably leads to the shifting of resonance losses to a wide frequency range, in particular, the lower frequency range. In addition, with fibres and clusters having different distances apart, the frequency width of resonance losses is further increased. All these problems also lead to the amplification of dielectric losses in a wide frequency band, in particular, the lower frequency range, and can affect the fabrication of dielectric materials for devices such as dielectric lenses, dielectric antennas etc.

Conventionally, low loss dielectric materials for instance, solid blocks of polystyrene, polyethylene, or the like, in use are relatively heavy in weight. For some applications of the dielectric materials, such as dielectric antennas, being heavy is considered an undesirable feature.

A need therefore exists to provide an artificial dielectric material that addresses at least one of the above-mentioned problems.

SUMMARY

In accordance with one aspect of the present invention, there is provided an artificial dielectric material comprising: a plurality of particles adhered together, the plurality of particles comprising a dielectric material; and at least one conductive fibre embedded in each particle of the plurality of particles.

The plurality of particles may be adhered together using a rubber adhesive or an adhesive comprising of a material in a group consisting of: polyurethane; and epoxy.

The plurality of particles may be randomly distributed in the artificial dielectric material.

The dielectric material may have a density in the range of 0.005 to 0.1 g/cm$^3$.

The dielectric material may be a foam polymer.

The foam polymer may be made of a material in a group consisting of: polyethylene; polyestyrene; polytetrafluoroethylene (PTEF); polypropylene; polyurethane; and silicon.

The average end-to-end measurement of each particle of the plurality of particles may be in the range of 0.5 to 5 mm.

Each particle of the plurality of particles may be substantially cube-shaped.

Each conductive fibre may be substantially needle shaped.

The conductive fibre may have a length in the range of 0.5 to 5 mm and a diameter in the range of 0.005 mm to 1 mm.

The at least one conductive fibre may be made of a material in a group consisting of: Copper; Aluminium; Nickel; Silver; and Gold.

Each particle of the plurality of particles may comprise at least two conductive fibres arranged in an array.

The at least two conductive fibres may be arranged parallel to one another.

The array may comprise 1 to 10 rows.

The array may comprise 1 to 10 columns.

The at least two conductive fibres may be oriented such that the conductive fibres in one row are parallel to the conductive fibres in another row.

The at least two conductive fibres may be oriented such that the conductive fibres in one row are transversely disposed with respect to the conductive fibres in another row.

The at least two conductive fibres may be oriented such that the conductive fibres in one column are parallel to the conductive fibres in another column.

The at least two conductive fibres may be oriented such that the conductive fibres in one column are transversely disposed with respect to the conductive fibres in another column.

The at least two conductive fibres may be evenly spaced apart.

The at least two conductive fibres may be randomly spaced apart.

Different dielectric materials may be used for different particles in the artificial dielectric material.

Different materials may be used for the conductive fibres in a first particle and the conductive fibres in a second particle in the artificial dielectric material.

In accordance with another aspect of the present invention, there is provided a method of manufacturing an artificial dielectric material, the method comprising: embedding at least one conductive fibre in each particle of a plurality of particles, the plurality of particles comprising a dielectric material; and adhering together the plurality of particles to form the artificial dielectric material.

The step of embedding at least one conductive fibre in each particle of the plurality of particles may comprise stacking one or more rows of conductive fibres in parallel arrangement and two or more sheets of the dielectric material such that each row of conductive fibres in parallel arrangement is disposed between at least two sheets of the dielectric material.

The method may further comprise cutting the stacked rows of conductive fibres and sheets of the dielectric material to produce the plurality of particles.

The method may further comprise mixing the plurality of particles so that the particles are randomly distributed in the formed artificial dielectric material.

BRIEF DESCRIPTION OF THE DRAWINGS

Embodiments of the invention will be better understood and readily apparent to one of ordinary skill in the art from the following written description, by way of example only and in conjunction with the drawings, in which.

DETAILED DESCRIPTION

An artificial dielectric material according to example embodiments of the present invention is lightweight, irrespective of its dielectric constant, and has low dielectric losses.

The artificial dielectric material of the example embodiments can be made from a plurality of randomly distributed particles adhered together. The plurality of randomly distributed particles is made of a lightweight dielectric material. The range of densities of the lightweight dielectric material can be 0.005 to 0.1 g/cm$^3$.

At least one needle-like conductive fibre is embedded within each particle. Where there are at least two conductive fibres embedded within each particle, the at least two conductive fibres are in an array like arrangement, i.e. having one or more row that include the conductive fibres. All the conductive fibres embedded within each particle are not in contact with one another.

In the example embodiments, each particle is represented as a cube. However, it is appreciated that the shape may vary in the actual implementation.

Advantageously, the distribution of the conductive fibres is uniform as every particle making up the artificial dielectric material of each example embodiment is substantially identical, that is, they include the same number of conductive fibre(s). Furthermore, as each particle embeds the conductive fibres in an array-like arrangement without allowing any contact between the conductive fibres, conductive clusters are prevented from occurring. This advantageously results in reduction of dielectric losses. The array-like arrangement can be a 1, 2, or 3 dimensional array.

In the example embodiments, the conductive fibres in array-like arrangement in one particle are randomly oriented with respect to the conductive fibres in array-like arrangement in another particle.

It is appreciated that the conductive fibres may be fully embedded within each particle to prevent exposed tips of conductive fibres in one particle from contacting exposed tips of conductive fibres within other particles. However, it is also acceptable even if the tips are exposed. While, it is possible to have tip to tip contact in this case, the probability of such contact is still significantly smaller than the contact of randomly mixed fibres to form clusters in the methods of conventional manufacturing of artificial dielectric materials as described previously.

Figure 1:
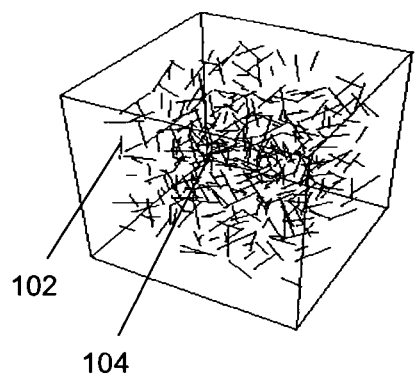
FIG. 1 (Prior Art) illustrates randomly distributed conductive fibres in a conventional artificial dielectric material.
Figure 2:
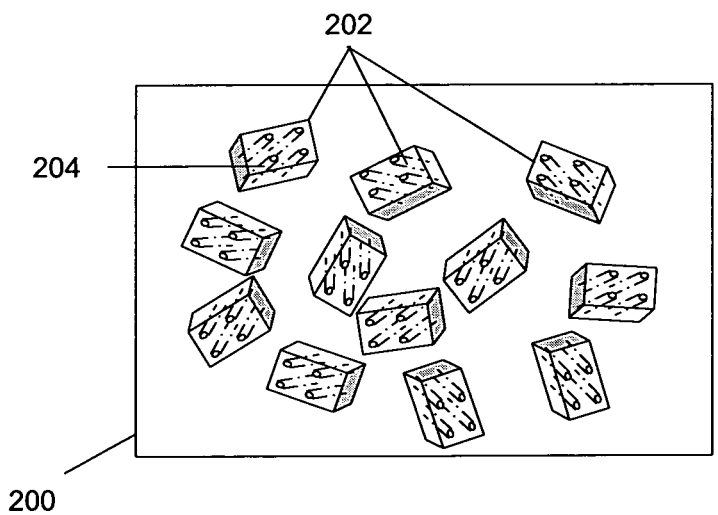
FIG. 2 illustrates random orientation of a multitude of particles in an artificial dielectric material according to an example embodiment.

FIG. 2 illustrates an artificial dielectric material 200 according to one example embodiment. The plurality of identical particles 202 in the artificial dielectric material 200 is randomly oriented. There are 4 conductive fibres 204 embedded in each particle 202 in the artificial dielectric material 200. The array arrangement of the 4 conductive fibres 204 is two by two, i.e. 2 rows and 2 columns of 4 evenly spaced conductive fibres in parallel arrangement with one another. In the embodiment, the length of each fibre can be about 1.5 mm and the size of each particle is about 1.5×1.5×1.5 mm. The particles can be made of a low-density polyethylene foam.

Figure 3:
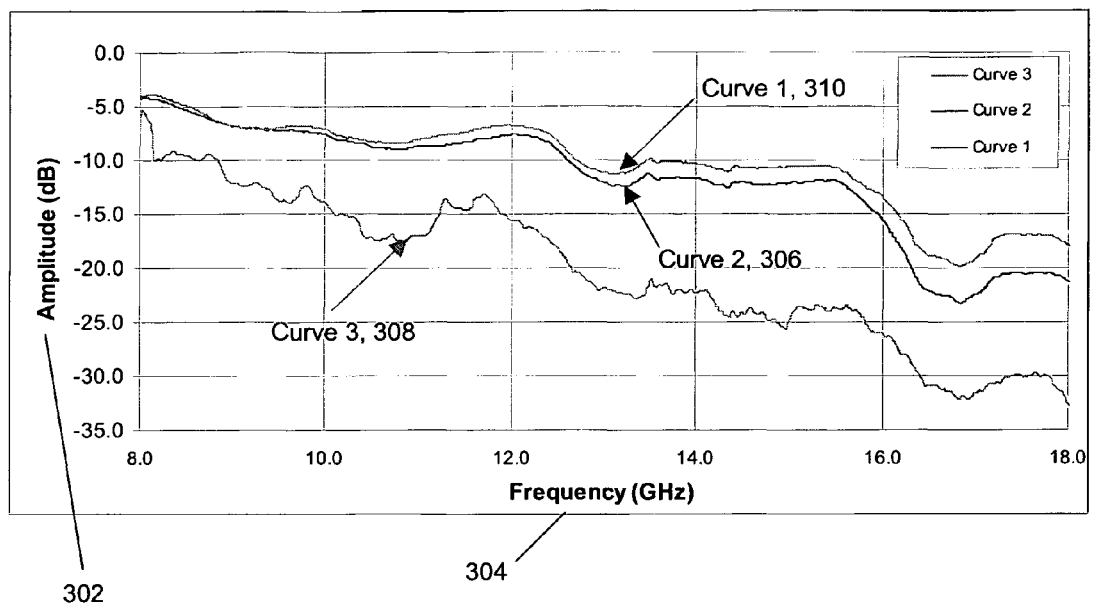
FIG. 3 illustrates results of measurements of transmission coefficient vs frequency for an empty waveguide, a waveguide filled with the artificial dielectric material of the example embodiment illustrated in FIG. 2 and a waveguide filled with a conventional artificial dielectric material.

FIG. 3 illustrates empirical results of measurements of transmission coefficient 302 vs frequency 304 for firstly, a hollow rectangular waveguide with a size of width, 10 mm, thickness, 23 mm and a length of 400 mm (curve 1, 310), secondly, the same waveguide filled with the artificial dielectric material 200 (FIG. 2) (curve 2, 306), and thirdly, the same waveguide filled with a dielectric material having randomly mixed conductive fibres (curve 3, 308).

The dielectric material used to generate curve 3, 308, has the same number, type and length of conductive fibres and the same volume of low-density polyethylene foam as the artificial dielectric material 200. The difference is in the method of manufacturing. The dielectric material used to generate curve 3, 308 is manufactured by randomly mixing the conductive fibres with low-density polyethylene foam, as is done conventionally. On the other hand, the method used for manufacturing the artificial dielectric material 200 ensures that each particle only consists of the same number of conductive fibres in a non-contact array-like arrangement.

The value of the transmission coefficient is a direct illustration of the dielectric losses in materials. The results in FIG. 3 show significant improvement of performance for the same waveguide filled with the artificial dielectric material 200 (curve 2, 306) over the performance of the same waveguide filled with dielectric materials having randomly mixed conductive fibres (curve 3, 308).

By observing curve 2, 306, and curve 3, 308, in FIG. 3, one can see that the difference in the transmission coefficient values between the two curves increases with frequency.

When comparing curve 1, 310, and curve 2, 306, one can see that curve 2, 306, has small losses (i.e. less than 0.5 dB) up to the frequency of 10 GHz (wavelength 30 mm). In contrast, when comparing curve 1, 310, and curve 3, 308, the losses up to the frequency of 10 GHz is on average about 5 dB.

The particles in the example embodiments of the present invention are made using a low-density and lightweight material. For instance, foam polymers made of polyethylene, with a typical density around 0.01 to 0.02 g/cm³. It is appreciated that other foam polymers made of materials, such as polystyrene, polytetrafluoroethylene (PTEF), polypropylene, polyurethane silicon, or the like, may be used to make the particles.

The size of each particle in an example embodiment may be set at about ½0 of the wavelength of the selected operating frequency. Hence, at an operating frequency of 10 GHz, particles about the size of 1.5×1.5×1.5 mm are used. It is appreciated that the average end-to-end measurement of particle size, for any shape the particle may take, can be in the range of about 0.5 to 5 mm.

It is appreciated that the fibre length may be in the range of about 0.5 to 5 mm depending on the operating frequency, and the diameter of each conductive fibre may range from 0.005 to 1 mm. To further reduce the weight of the material, conductive fibres with smaller diameter may be used subject to the limitation that the skin depth at the operating frequency must be much smaller than the fibre diameter.

The embedded conductive fibres in the particles can be made from highly conductive materials, for instance, copper, silver, gold, aluminium, nickel or the like.

Different configurations of the array like arrangement of the conductive fibres in each particle can achieve different dielectric constants for the material. To achieve higher values of the dielectric constant, the number of fibres in each particle is increased. Conversely, to achieve lower values of the dielectric constant, the number of fibres in each particle is reduced.

In the array like arrangement of the example embodiment, each row of the array consists of a row of conductive fibres arranged in parallel to one another. Each row can include different number of fibres that are evenly or randomly spaced apart. The distance between the fibres in adjacent rows can also be evenly or randomly spaced apart.

The fibres in different rows of the array can be oriented such that the fibres in one row are in parallel or transversely disposed (for instance, arranged perpendicularly) with respect to the fibres in another row.

In another embodiment, each column of the array can include a column of conductive fibres arranged in parallel to one another. Each column can include different number of fibres that are evenly or randomly spaced apart. The distance between the fibres in adjacent columns can also be evenly or randomly spaced apart.

The fibres in different columns of the array can be oriented such that the fibres in one column are in parallel or transversely disposed (for instance, arranged perpendicularly) with respect to the fibres in another column.

It is appreciated that the number of fibres in each row and column may range from 1 to 10 or beyond. In one embodiment, each particle can have a 10×10 array of conductive fibres having 10 rows and 10 columns.

Some configurations illustrating the array like arrangement of the conductive fibres are herein described with reference to FIGS. 4 and 5.

Figure 4:
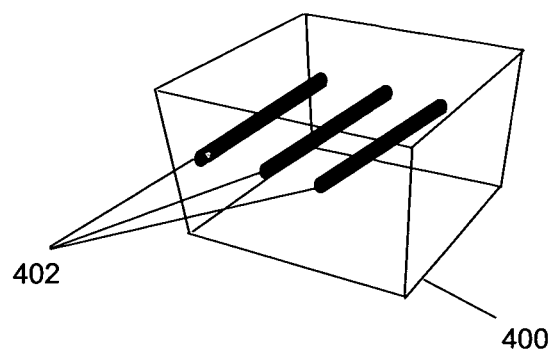
FIG. 4 shows a particle in an artificial dielectric material according to an example embodiment.

FIG. 4 shows one embodiment of a particle 400 that includes a single row array of three needle-like conductive fibres 402.

Figure 5:
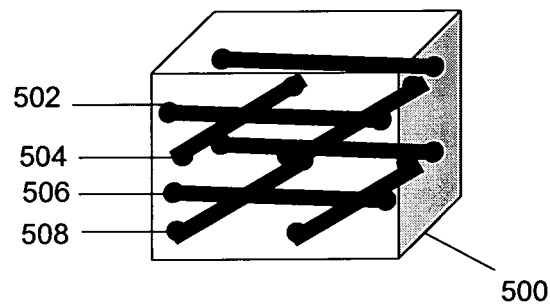
FIG. 5 shows a particle in an artificial dielectric material according to an alternate example embodiment.

FIG. 5 shows a particle 500 that includes four rows of fibres 502, 504, 506 and 508. In this end, each row can include two evenly spaced fibres in a parallel arrangement. The second row 504 and fourth row 508 are oriented such that their conductive fibres are substantially perpendicular to the first row 502 and the third row 506.

The properties and frequency dependence of the different configurations of the artificial dielectric materials according to the example embodiments is herein described with reference to FIGS. 6 to 9.

Figure 6:
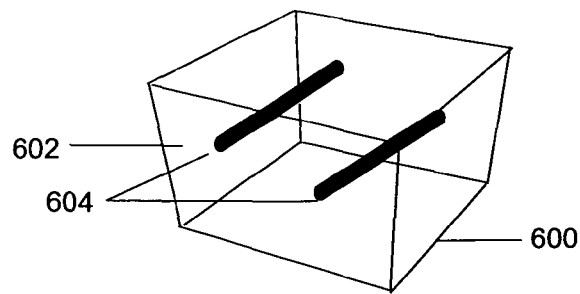
FIG. 6 shows a particle in an artificial dielectric material according to another alternate example embodiment.

FIG. 6, illustrates a particle residing in an alternate embodiment of the present invention.

The particle 600 has a size of about 1.5×1.5×1.5 mm and is made of a foam-type expanded polyethylene with a density of about 20 kg/m³. The number of rows 602 is 1. The number of conductive fibres 604 in each row is 2. The distance between adjacent conductive fibres is about 1 mm. The length of each conductive fibre is about 1.5 mm and the diameter of each conductive fibre is about 0.025 mm. The material used for the conductive fibres is copper.

An artificial dielectric material created by randomly mixing together a plurality of particles 600 has a density of about 51 kg/m³. At an operating frequency of about 10 GHz, the real part of the dielectric permittivity of the material, $\in'$, is 1.25. The imaginary part of the dielectric permittivity, $\in''$, (i.e. dielectric losses) is less than 0.001.

Figure 7:
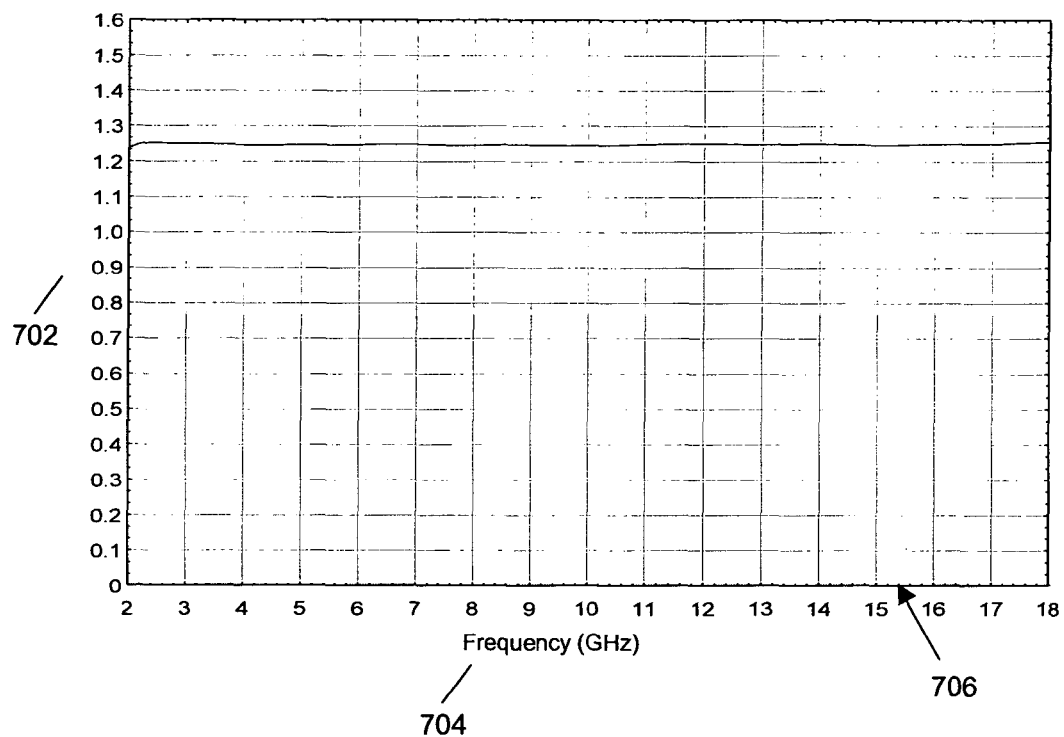
FIG. 7 shows the frequency dependence of the dielectric permittivity of an artificial dielectric material composed of the particle illustrated in FIG. 6.

The frequency dependence of the dielectric permittivity of the resultant dielectric material composed of the particle 600 in FIG. 6 is illustrated in FIG. 7. FIG. 7 shows a plot of dielectric permittivity 702 vs frequency (GHz) 704. As one can see from FIG. 7, the real part of the dielectric permittivity is almost constant at frequency band 2-18 GHz. The imaginary part of dielectric permittivity $\in''$ has a small value of approximately 0.001 at 10 GHz and is barely visible in the figure.

Figure 8:
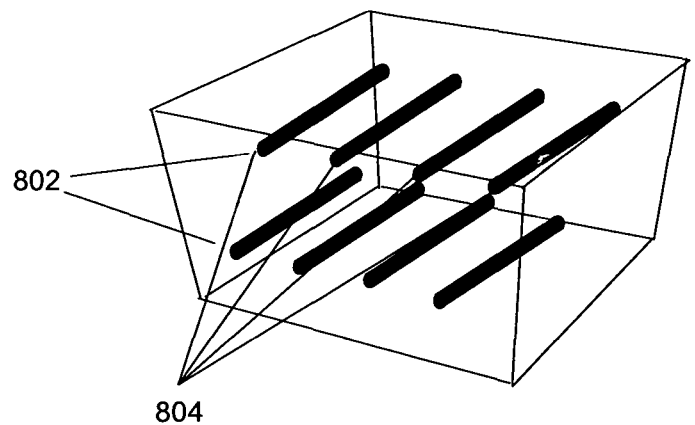
FIG. 8 shows a particle in an artificial dielectric material according to another alternate example embodiment.

FIG. 8, illustrates a particle 800 residing in another alternate embodiment of the present invention.

The particle 800 has a size of about 1.5×1.5×1.5 mm and is made of a foam-type expanded polyethylene with a density of about 20 kg/m³. The number of array rows 802 is 2. The number of conductive fibres 804 in each array row is 4. The distance between adjacent conductive fibres is about 0.3 mm. The length of each conductive fibre is about 1.5 mm and the diameter of each conductive fibre is about 0.025 mm. The material used for the conductive fibres is copper.

An artificial dielectric material created by randomly mixing together a multitude of particles 800 has a density of about 68 kg/m³. At an operating frequency of 10 GHz, the real part of the dielectric permittivity of the material, $\in'$, is 1.46. The imaginary part of the dielectric permittivity, $\in''$, (i.e. dielectric losses) is less than 0.001.

Figure 9:
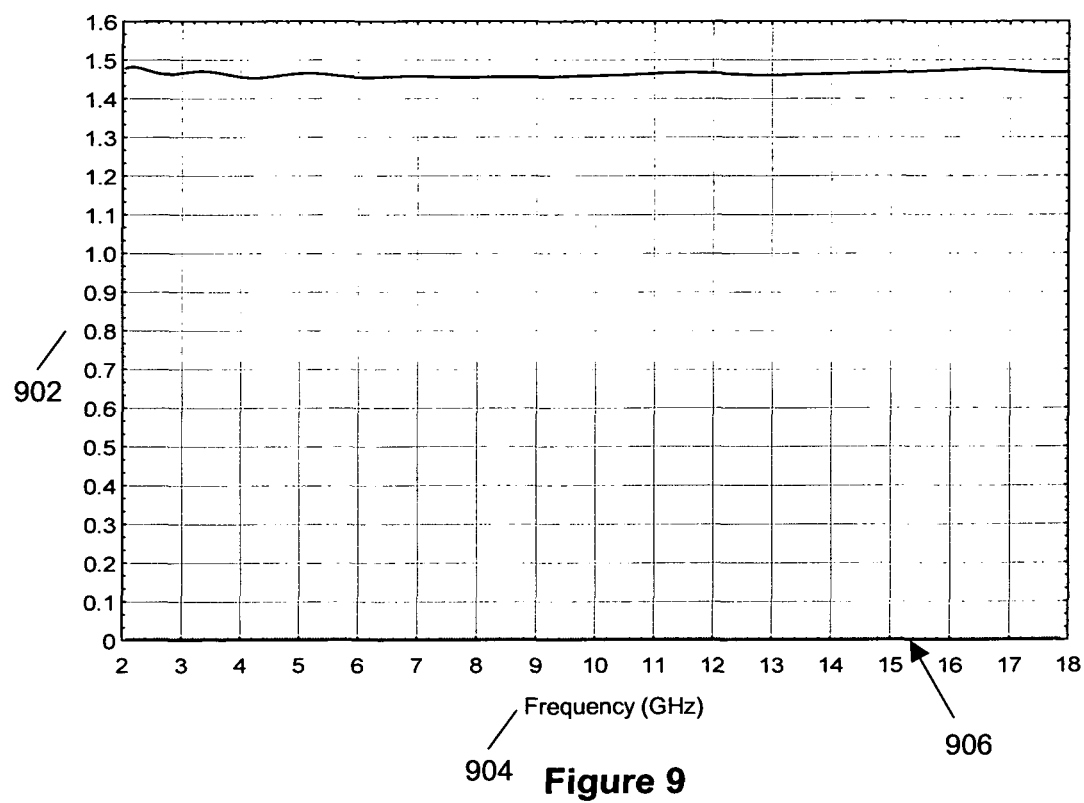
FIG. 9 shows the frequency dependence of the dielectric permittivity of an artificial dielectric material composed of the particle illustrated in FIG. 8.

The frequency dependence of the dielectric permittivity of the resultant dielectric material composed of the particle 800 in FIG. 8 is illustrated in FIG. 9. FIG. 9 shows a plot of dielectric permittivity 902 vs frequency (GHz) 904. As one can see from FIG. 9, the real part of the dielectric permittivity is almost constant at frequency band 2-18 GHz. The imaginary part of dielectric permittivity £" has a small value of approximately 0.001 at 10 GHz and is barely visible in the figure.

Figure 10:
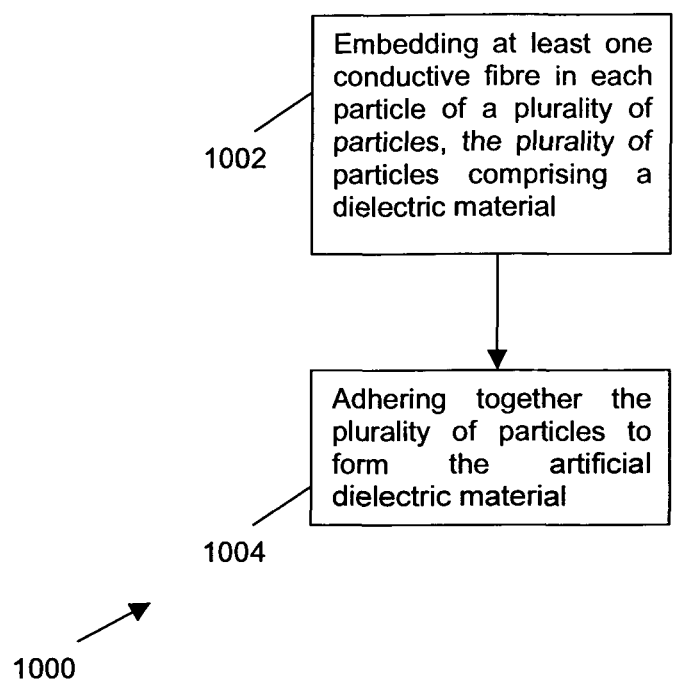
FIG. 10 shows the steps involved in the process of manufacturing an artificial dielectric material according to an example embodiment.

FIG. 10 is a flowchart 1000 illustrating a method for manufacturing an artificial dielectric material according to an example embodiment of the present invention. At step 1002, at least one conductive fibre is embedded in each particle of a plurality of particles, wherein the plurality of particles comprises a dielectric material. At step 1004, the plurality of particles is adhered together to form the artificial dielectric material.

Figure 11:
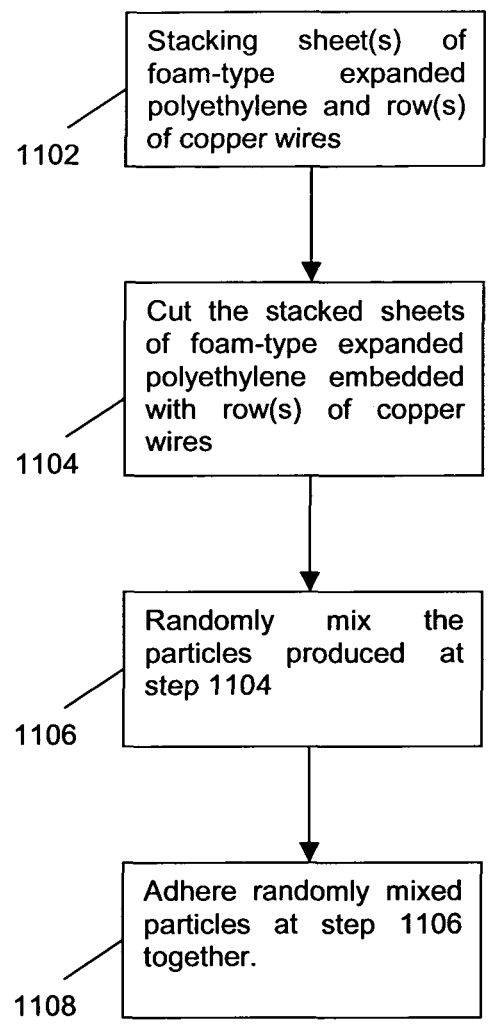
FIG. 11 shows the steps involved in the process of manufacturing an artificial dielectric material according to another example embodiment.

In another example embodiment, the process of manufacturing the artificial dielectric material involves the following steps, as shown in FIG. 11.

At step 1102, copper wires of similar length and diameter in parallel arrangement are embedded in between sheets of foam-type expanded polyethylene. Each row of conductive fibres in parallel arrangement is disposed in between at least two sheets of the foam-type expanded polyethylene. Firstly, a sheet of foam-type expanded polyethylene is placed in position to form a base layer. Next, a row of copper wires in parallel arrangement is placed over and adhered to the top surface of the base layer. Thereafter, another sheet of foam-type expanded polyethylene is placed over and adhered to the exposed copper wires so as to cover the exposed copper wires. If more than one row of copper wires is desired, more rows of copper wires and sheets of foam-type expanded polyethylene can be stacked one on top of the other in the similar fashion. At this step, the user can decide on the material to use for the wires and the lightweight dielectric material, the number of rows of copper wires desired and the orientation of each row of copper wires. The thickness of the lightweight dielectric material and the distance between the parallel copper wires can also be adjusted.

To achieve particles as described in FIG. 5, five sheets of foam-type expanded polyethylene are used to sandwich four rows of copper wires therebetween. The sheets of foam-type expanded polyethylene and rows of wires are stacked in the manner described above. Adjacent rows of the four rows of wires would be deliberately placed perpendicular to one another.

To achieve particles as described in FIG. 8, three sheets of foam-type expanded polyethylene are used to sandwich two rows of copper wires therebetween. Adjacent rows of the four rows of wires would be deliberately placed parallel to one another.

After stacking the sheets in step 1102 to achieve the desired particle design, the stacked sheets are cut using suitable tools and machinery to produce the particles at step 1104.

At step 1106, all the particles produced in step 1104 are mixed randomly.

At step 1108, the randomly mixed particles in step 1106 are coated with an adhesive and allowed to dry. The dried mixture forms a solid artificial dielectric material. The solid artificial dielectric material may be cut or further adhered together to form various sizes for use in different applications.

Examples of the type of adhesive used in the process are rubber adhesives or adhesives consisting of polyurethane, epoxy or the like, which have low dielectric losses.

Depending on the application of the dielectric material, it is appreciated that different materials may be used for different particles in the same artificial dielectric material according to the example embodiments.

It is also appreciated that different materials may be used for the conductive fibres in one particle and the conductive fibres in another particle in the same artificial dielectric material according to the example embodiments.

Examples of some applications for the artificial dielectric material according to the example embodiments are microwave lenses and dielectric antennas.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. An artificial dielectric material comprising: a plurality of particles adhered together, the plurality of particles comprising a dielectric material; and at least one conductive fibre embedded in each particle of the plurality of particles.

2. The artificial dielectric material as claimed in claim 1, wherein the plurality of particles are adhered together using a rubber adhesive or an adhesive comprising of a material in a group consisting of: polyurethane; and epoxy.

3. The artificial dielectric material as claimed in claim 1, wherein the plurality of particles is randomly distributed in the artificial dielectric material.

4. The artificial dielectric material as claimed in claim 1, wherein the dielectric material has a density in the range of 0.005 to 0.1 g/cm$^3$.

5. The artificial dielectric material as claimed in claim 1, wherein the dielectric material is a foam polymer.

6. The artificial dielectric material as claimed in claim 5, wherein the foam polymer is made of a material in a group consisting of:
polyethylene;
polyestyrene;
polytetrafluoroethylene (PTEF);
polypropylene;
polyurethane; and
silicon.

7. The artificial dielectric material as claimed in claim 1, wherein an average end-to-end measurement of each particle of the plurality of particles is in the range of 0.5 to 5 mm.

8. The artificial dielectric material as claimed in claim 1, wherein each particle of the plurality of particles is substantially cube-shaped.

9. The artificial dielectric material as claimed in claim 1, wherein each conductive fibre is substantially needle shaped.

10. The artificial dielectric material as claimed in claim 1, wherein the conductive fibre has a length in the range of 0.5 to 5 mm and a diameter in the range of 0.005 mm to 1 mm.

11. The artificial dielectric material as claimed in claim 1, wherein the at least one conductive fibre is made of a material in a group consisting of:
Copper;
Aluminium;
Nickel;
Silver; and
Gold.

12. The artificial dielectric material as claimed in claim 1, wherein each particle of the plurality of particles comprises at least two conductive fibres arranged in an array.

13. The artificial dielectric material as claimed in claim 12, wherein the at least two conductive fibres are arranged parallel to one another.

14. An artificial dielectric material as claimed in claim 12, wherein the array comprises 1 to 10 rows.

15. An artificial dielectric material as claimed in claim 12, wherein the array comprises 1 to 10 columns.

16. The artificial dielectric material as claimed in claim 12, wherein the at least two conductive fibres are oriented such that the conductive fibres in one row are parallel to the conductive fibres in another row.

17. The artificial dielectric material as claimed in claim 12, wherein the at least two conductive fibres are oriented such that the conductive fibres in one row are transversely disposed with respect to the conductive fibres in another row.

18. The artificial dielectric material as claimed in claim 12, wherein the at least two conductive fibres are oriented such that the conductive fibres in one column are parallel to the conductive fibres in another column.

19. The artificial dielectric material as claimed in claim 12, wherein the at least two conductive fibres are oriented such that the conductive fibres in one column are transversely disposed with respect to the conductive fibres in another column.

20. The artificial dielectric material as claimed in claim 12, wherein the at least two conductive fibres are evenly spaced apart.

21. The artificial dielectric material as claimed in claim 12, wherein the at least two conductive fibres are randomly spaced apart.

22. The artificial dielectric material as claimed in claim 1, wherein different dielectric materials are used for different particles in the artificial dielectric material.

23. The artificial dielectric material as claimed in claim 1, wherein different materials are used for the conductive fibres in a first particle and the conductive fibres in a second particle in the artificial dielectric material.

24. An artificial dielectric material comprising (A) a plurality of particles that comprise a dielectric material, (B) at least one conductive fibre embedded in each particle of said plurality, and (C) an adhesive in contact with said plurality.

* * * * *